United States Patent
Conner et al.

(12) 
(10) Patent No.: US 7,182,463 B2
(45) Date of Patent: Feb. 27, 2007

(54) PIXEL-SHIFTING PROJECTION LENS ASSEMBLY TO PROVIDE OPTICAL INTERLACING FOR INCREASED ADDRESSABILITY

(75) Inventors: Arlie R. Conner, Portland, OR (US); Gary B. Kingsley, Beaverton, OR (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/744,997

(22) Filed: Dec. 23, 2003

(65) Prior Publication Data

US 2005/0134805 A1 Jun. 23, 2005

(51) Int. Cl.
G03B 21/28 (2006.01)
G02F 1/1335 (2006.01)
G02B 26/08 (2006.01)

(52) U.S. Cl. .......................... 353/31; 353/84; 353/98; 349/95; 349/108; 349/109; 349/144; 359/209; 359/214; 359/223; 359/225; 359/226

(58) Field of Classification Search .................. 353/20, 353/30, 31, 38, 69, 98, 99, 122, 84; 349/5, 349/74, 84, 95, 104, 106, 108, 109, 134, 349/142–144, 146; 359/224, 291, 495, 618, 359/619, 621, 622, 685, 708, 733, 737, 223, 359/225, 226, 196, 197, 209–214; 348/806, 348/739, 742–747

See application file for complete search history.

(56) References Cited

U.S. PATENT DOCUMENTS

| 4,209,224 | A | 6/1980 | Stewart, Jr. |
| 4,257,053 | A | 3/1981 | Gilbreath |
| 4,695,721 | A | 9/1987 | Fulkerson et al. |
| 4,994,670 | A | 2/1991 | Noble et al. |
| 5,063,450 | A | 11/1991 | Pritchard |
| 5,161,042 | A | 11/1992 | Hamada |
| 5,402,184 | A | * | 3/1995 | O'Grady et al. ............ 348/764 |
| 5,428,467 | A | 6/1995 | Schmidt |
| 5,446,378 | A | 8/1995 | Reich et al. |
| 5,467,206 | A | 11/1995 | Loiseaux et al. |

(Continued)

FOREIGN PATENT DOCUMENTS

EP 0 606 162 7/1994

(Continued)

OTHER PUBLICATIONS

Tokita, et al., "P-108: FLC Resolution-Enhancing Device for Projection Displays", *SID 02 Digest*, pp. 1-5.

Primary Examiner—W. B. Perkey
Assistant Examiner—Rochelle Blackman
(74) Attorney, Agent, or Firm—George W. Jonas

(57) ABSTRACT

A projection display system includes a projection lens assembly that has multiple projection lens elements that are configured to receive light imparted with display information by a pixelated display device. The projection lens elements project the light toward a display screen. A pixel-shifting element is included within the projection lens assembly to cyclically shift between at least two positions within the projection lens assembly to form at a display screen at least two interlaced arrays of pixels. An electromechanical transducer is coupled to the pixel-shifting element to impart on it the cyclic shifting between positions.

12 Claims, 5 Drawing Sheets

U.S. PATENT DOCUMENTS

| | | | |
|---|---|---|---|
| 5,506,701 A | | 4/1996 | Ichikawa |
| 5,537,256 A | | 7/1996 | Fergason |
| 5,550,605 A | * | 8/1996 | Haraguchi et al. ............ 353/81 |
| 5,600,486 A | | 2/1997 | Gal et al. |
| 5,602,679 A | | 2/1997 | Dolgoff et al. |
| 5,626,411 A | * | 5/1997 | Takahashi et al. ............ 353/94 |
| 5,633,737 A | | 5/1997 | Tanaka et al. |
| 5,661,603 A | | 8/1997 | Hanano et al. |
| 5,715,029 A | | 2/1998 | Fergason |
| 5,727,860 A | * | 3/1998 | Broer et al. ................... 353/20 |
| 5,748,828 A | | 5/1998 | Steiner et al. |
| 5,760,850 A | | 6/1998 | Nakanishi et al. |
| 5,764,319 A | | 6/1998 | Nishihara |
| 5,842,762 A | * | 12/1998 | Clarke ........................ 353/122 |
| 5,872,654 A | | 2/1999 | Shirochi |
| 5,897,191 A | | 4/1999 | Clarke |
| 5,969,832 A | * | 10/1999 | Nakanishi et al. ............ 359/15 |
| 5,984,478 A | | 11/1999 | Doany et al. |
| 6,141,124 A | | 10/2000 | Suzuki et al. |
| RE37,218 E | | 6/2001 | Densmore et al. |
| 6,243,055 B1 | | 6/2001 | Fergason |
| 6,280,037 B1 | | 8/2001 | Smith |
| 6,320,698 B1 | | 11/2001 | Suzuki |
| 6,359,719 B1 | | 3/2002 | Ori |
| 6,374,048 B1 | | 4/2002 | Uenaka et al. |
| 6,407,726 B1 | | 6/2002 | Endo et al. |
| 6,426,810 B1 | | 7/2002 | Joubert et al. |
| 6,464,359 B1 | | 10/2002 | Owen et al. |
| 6,574,032 B1 | | 6/2003 | Roddy et al. |
| 6,657,603 B1 | | 12/2003 | Demetrescu et al. |
| 2002/0003636 A1 | | 1/2002 | Conner |
| 2002/0008812 A1 | | 1/2002 | Conner et al. |
| 2003/0058412 A1 | | 3/2003 | Owen et al. |
| 2003/0206247 A1 | | 11/2003 | Childers et al. |
| 2003/0206248 A1 | | 11/2003 | Childers |
| 2003/0206249 A1 | | 11/2003 | Childers |
| 2003/0206250 A1 | | 11/2003 | Childers et al. |
| 2003/0222980 A1 | * | 12/2003 | Miyagaki et al. ........... 348/115 |
| 2004/0027313 A1 | | 2/2004 | Pate et al. |
| 2004/0179030 A1 | | 9/2004 | Cole et al. |
| 2004/0207815 A1 | | 10/2004 | Allen et al. |
| 2005/0024391 A1 | | 2/2005 | Damera-Venkata et al. |
| 2005/0024593 A1 | | 2/2005 | Pate et al. |
| 2005/0025388 A1 | | 2/2005 | Damera-Venkata et al. |
| 2005/0057732 A1 | * | 3/2005 | Hayashi ...................... 353/101 |
| 2005/0078056 A1 | | 4/2005 | Childers |

FOREIGN PATENT DOCUMENTS

| | | | |
|---|---|---|---|
| EP | 0 669 757 | | 8/1995 |
| EP | 1 111 575 | | 6/2001 |
| GB | 2 258 109 | | 1/1993 |
| JP | 2032681 | | 2/1990 |
| JP | 4319937 | | 11/1992 |
| JP | 5183805 | | 7/1993 |
| JP | 07-107278 | * | 4/1995 |
| JP | 2002-171446 | | 6/2002 |
| KR | 2003-081706 | | 10/2003 |
| KR | 2003-093373 | | 12/2003 |
| KR | 2004-064825 | | 7/2004 |
| KR | 2004-082048 | | 9/2004 |
| KR | 2004-082859 | | 9/2004 |
| KR | 2004-094133 | | 11/2004 |
| WO | WO 2005/045506 | | 5/2005 |

* cited by examiner

PIXEL-SHIFTING PROJECTION LENS ASSEMBLY TO PROVIDE OPTICAL INTERLACING FOR INCREASED ADDRESSABILITY

TECHNICAL FIELD

The present invention relates to projection lens assemblies for projection display systems and, in particular, to a projection lens assembly that includes a pixel-shifting element to provide optical interlacing of pixels for increased addressability.

BACKGROUND OF THE INVENTION

In many types of display systems images are formed by pixelated optical modulators such as conventional liquid crystal displays, digital micromirror devices, liquid crystal-on-silicon modulators, etc. Although there are many advantages of these pixelated displays, they can also bring with them the disadvantage of fixed and relatively coarse addressability. Resolution relates to the number of pixels in a pixelated display panel, and addressability relates to the number of pixel locations in a display image (i.e., the display panel resolution times the number of distinct positions that each pixel can occupy in a display image).

Another problem is that each picture element in some pixelated displays includes a central imaging area or aperture that transmits or reflects image information and is bounded by an opaque border. The opaque borders can encompass significant portions of the picture elements relative to the optical apertures. In projection display systems, the projected images of these picture elements can have discernible image artifacts relating to the picture element borders. The image artifacts can include rough image edges and visible dark disruptions in image consistency.

Attempts have been made to improve the image appearance by physically shifting light from pixelated display devices in order to shift pixel images and thereby increase addressability. In one instance, a pixelated front projector shifted display pixels using a pixel-shifting device preceding or following a projection lens assembly. In one implementation, a pixel-shifting assembly included silicone material pressed between two glass plates. The assembly was positioned after a projection lens assembly and three solenoids operated together to tilt the glass plates relative to each other to effect fill-in pixel scanning. In another implementation, a cantilevered glass plate was positioned in front of a projection lens assembly and driven by a pair of modulators also to effect fill-in pixel scanning.

While providing in-fill pixel scanning both of the implementations can suffer from disadvantages relating to maintaining optimal image clarity. The pixel-shifting assembly positioned after a projection lens operates in a diverging optical space where light from the projection lens is diverging as it propagates toward a display screen. Shifting pixel locations in such a diverging optical space can introduce defects relating to differences in the propagation angles of light being projected toward different portions of the display screen. The pixel-shifting assembly positioned before a projection lens operates in a telecentric optical space in which the tilted plate causes astigmatism and reduces the lens performance.

These disadvantages could be even more greatly exaggerated if the addressability improvement methods for front projectors were employed in rear projectors. A front projector is positioned in front of a reflective display screen, together with the viewers of any displayed image. In contrast, a rear projector is positioned behind a transmissive display screen, opposite the viewers of the displayed images. Rear projectors typically have relatively short focal lengths relative to the size of the display screen, so projection lens assemblies in these projectors have much steeper projection angles of up to about 45 degrees compared to projection angles of about 25–30 degrees for projection lens assemblies in front projectors. As a consequence, addressability improvements for front projectors are likely to be substantially less successful for rear projectors.

SUMMARY OF THE INVENTION

Accordingly, the present invention includes a projection lens assembly for a projection display system. The projection lens assembly includes multiple projection lens elements that are configured to receive light imparted with display information by a pixelated display device. The projection lens elements project the light toward a display screen. A pixel-shifting element is included within the projection lens assembly to cyclically shift between at least two positions within the projection lens assembly to form, at a display screen, at least two interlaced arrays of pixels. An electromechanical transducer is coupled to the pixel-shifting element to impart on it the cyclic shifting between positions. The invention also includes a projection display system incorporating such a lens assembly.

The projection lens assembly with a pixel-shifting element included among the lens elements can often provide resolutions that are at least twice the actual resolution of the pixelated display device. In addition, the optical space within the projection lens is typically significantly less susceptible to introducing image artifacts that are pixel-scanners positioned before or after a projection lens. Furthermore, shifting pixels within the projection lens assembly can allow the pixel-shifting element to be formed of a smaller size, which can reduce any difficulty of manipulating a pixel-shifting element at the required speeds.

Additional description and implementations of the present invention will be apparent from the detailed description of the preferred embodiment thereof, which proceeds with reference to the accompanying drawings.

DETAILED DESCRIPTION OF PREFERRED EMBODIMENTS

Figure 1:
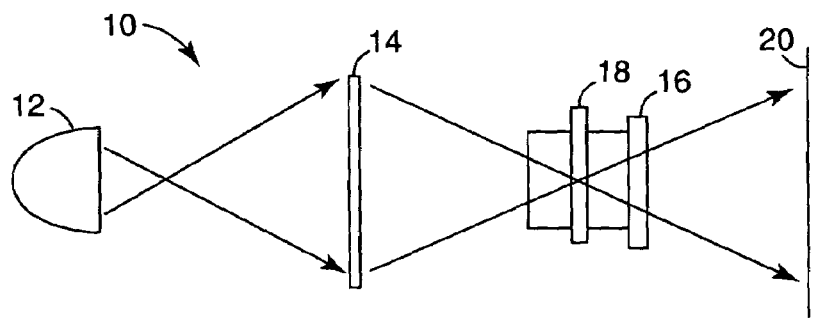
FIG. 1 is a schematic side view of a projection display system employing pixel-shifting optical interlace for increased pixel addressability according to the present invention.

FIG. 1 is a schematic side view of a projection display system 10 employing pixel-shifting optical interlace for increased pixel addressability according to the present invention. Projection system 10 includes an illumination system 12, a pixelated display device 14, and a multi-lens projection lens assembly 16 with a pixel-shifting element 18. It will be appreciated that the schematic representation of FIG. 1 does not show various conventional optical elements as are known in the art of projection displays.

Illumination system 12 directs illumination light at pixelated display device 14, which imparts display information on the illumination light in any conventional or similar manner. Pixelated display device 14 may include a liquid crystal display, a digital micromirror device, or any other type of pixelated display device. Illumination light may be transmitted through pixelated display device 14 as illustrated or may alternatively be reflected from it. Projection lens assembly 16 projects onto a display surface 20 the display information received from pixelated display device 14, thereby to form a display image. Display surface 20 may be primarily reflective so that the display image is reflected toward one or more viewers, as in a front projector, or may be primarily transmissive so that the display image is transmitted through toward one or more viewers, as in a rear projection display. Examples of suitable projection display systems with reflective display surfaces 20 are described in U.S. Pat. No. 6,486,997.

Pixel-shifting element 18 is included within projection lens assembly 16 and cyclically shifts between at least two positions to shift optical paths of light as it passes through projection lens assembly 16, thereby cyclically shifting where the optical paths meet display screen 20. Image information imparted by picture elements of pixelated display 14 is carried along the optical paths to meet display screen 20 as image pixels. The cyclic shifting of pixel-shifting element 18 results in pixels being shifted in position at display screen 20.

Figure 2:
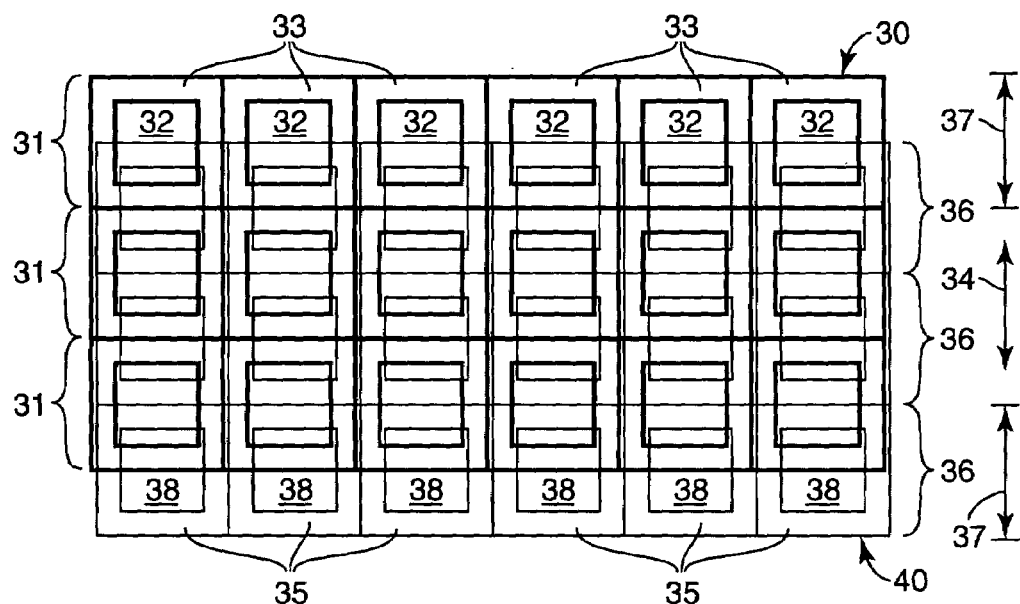
FIG. 2 is an enlarged schematic representation of pixels positioned on a display screen in interlaced arrays as a result of pixel shifting according to the present invention.

FIG. 2 is an enlarged representation of reduced-aperture pixels 30 (in bold lines) positioned on display screen 20 in three partial rows 31 without shifting. Each pixel 30 includes a central light aperture 32 and an opaque border 33 as is characteristic of conventional liquid crystal display devices. Image information imparted by pixelated display device 14 corresponds to light passing through or striking apertures 32. Opaque borders 33 function to provide separation between apertures 32. As the optical elements of some projection display systems have decreased in size, the area of opaque borders 33 has increased relative to the area of light apertures 32, thereby decreasing the addressibility or resolvability of pixels 30.

Within this context pixel shifting element 18 functions to cyclically shift pixels on display screen 20 along at least one axis 34 that is transverse (e.g., perpendicular) to rows 31. As a result, pixels 30 are positioned in rows 31 during one time period, and shifted-pixels 35 (not in bold lines) are positioned in rows 36 during a second time period. This forms two interlaced arrays of pixels 30 and 35. Pixels 30 in rows 31 and shifted-pixels 35 in rows 36 are alternately rendered on display screen 20. Rows 31 and 36 are offset from each other by about one-half their shared pitch 37, so that shifted-pixels 35 have light apertures 38 that overlap opaque borders 33 of pixels 30 in rows 31. It will be understood that the pixels in this embodiment and the other embodiments described herein could be shifted additionally or alternatively to form offset columns. For example, the pixels could be shifted in the appropriate direction to form offset columns in a manner similar to the formation of offset rows 31 and 36.

The cyclic shifting between rows 31 and 36 represents a one-dimensional shifting that doubles the effective number of pixels 30 and 35 on display screen 20 relative to the number of picture elements in pixelated display device 14. This doubling has the benefit of providing twice the apparent number of imaging positions, which results in improved image quality.

It will be appreciated that pixels 30 in rows 31 are shifted relative to shifted-pixels 35 in rows 36 to the same extent that shifted-pixels 35 in rows 36 are shifted relative to pixels 30 in rows 31. The terminology "pixels 30" and "shifted-pixels 35" is used merely for purposes of illustration and does not indicate a functional distinction between the pixels 30 and 35.

Figure 3:
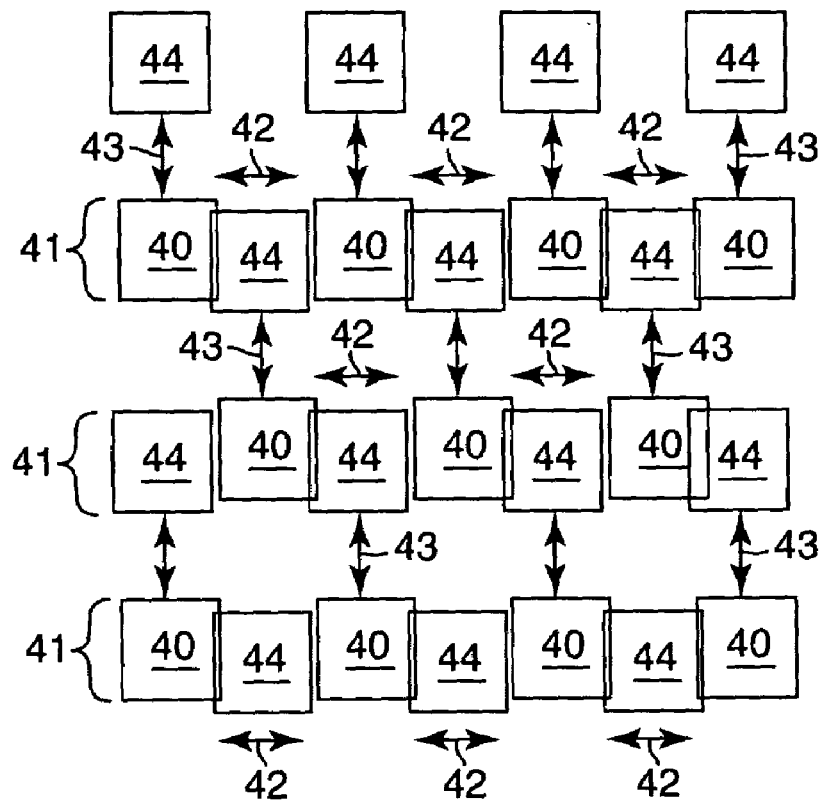
FIG. 3 is an enlarged schematic representation of pixels positioned on a display screen in a diagonal matrix with shifted-pixels interposed between the pixels of each row.

FIG. 3 is an enlarged representation of pixels 40 (in bold lines) positioned on display screen 20 in rows 41 of a spaced-apart diagonal matrix without shifting. The spaced-apart diagonal matrix is characterized by the picture elements in successive rows 41 being offset in a lateral direction 42, as is characteristic of some conventional liquid crystal display devices.

Within this context pixel shifting element 18 functions to cyclically shift pixels 40 on display screen 20 along at least one axis 43 that is transverse (e.g., perpendicular) to rows 41. As a result, pixels 40 are positioned in rows 41 during one time period, and shifted-pixels 44 (not in bold lines) are interposed between pixels 40 in adjacent rows 41 during a second time period. This doubles the number of pixels 40 in each row 41. Pixels 40 and shifted-pixels 44 are alternately rendered on display screen 20.

Figure 4:
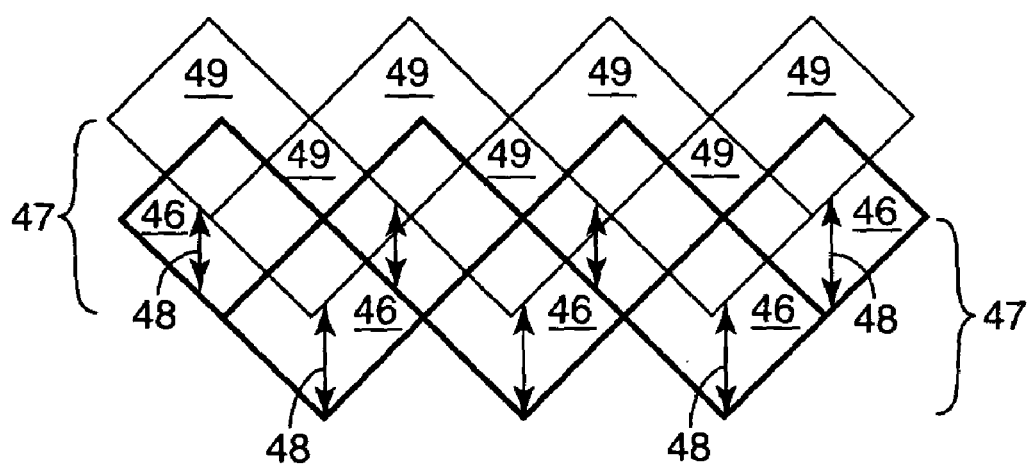
FIG. 4 is an enlarged representation of pixels positioned on a display screen in interdigitated rows that include shifted pixels.

FIG. 4 is an enlarged representation of pixels 46 (in bold lines) positioned on display screen 20 in interdigitated rows 47. Interdigitation of rows 47 is provided by having apexes of adjacent pixels 46 facing each other, thereby giving pixels 46 an appearance that is sometimes referred to as "diamond-shaped." Such an arrangement of pixels 46 may be employed in a high-aperture pixelated display device 14, such as a digital micromirror device.

Within this context pixel shifting element 18 functions to cyclically shift pixels 46 on display screen 20 along at least one axis 48 that is transverse (e.g., perpendicular) to interdigitated rows 47. As a result, pixels 46 are positioned in rows 47 during one time period, and shifted-pixels 49 (not in bold lines) are positioned in adjacent rows 47 during a second time period. Shifted-pixels 49 are shifted by about one-half the pitch of rows 47 and provide increased pixel addressability. Pixels 40 and shifted-pixels 49 are alternately rendered on display screen 20.

Figure 5:
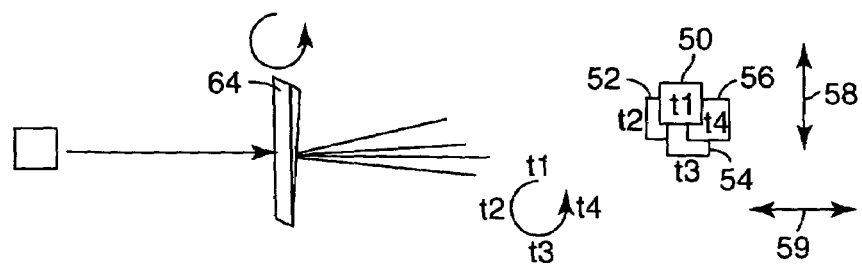
FIG. 5 is an enlarged representation of pixels in four different positions on display screen resulting from shifting in two transverse directions to provide two-dimensional pixel shifting.

FIG. 5 is an enlarged representation of pixels 50–56 in four different positions on display screen 20 resulting from two-dimensional pixel shifting along two transverse axes 58 and 59. Pixels 50–56 correspond to light from a single picture element in pixelated display device 14. It will be appreciated that the light from each picture element in pixelated display device 14 would likewise be shifted in transverse directions 58 and 59 to form four interlaced arrays of pixels.

The cyclic shifting along axes 58 and 59 represents two-dimensional shifting that provides on display screen 20 four-times the number of picture elements in pixelated display device 14. As with the one-dimensional shifting, this two dimensional shifting provides the benefit of improved image quality.

Figure 6:
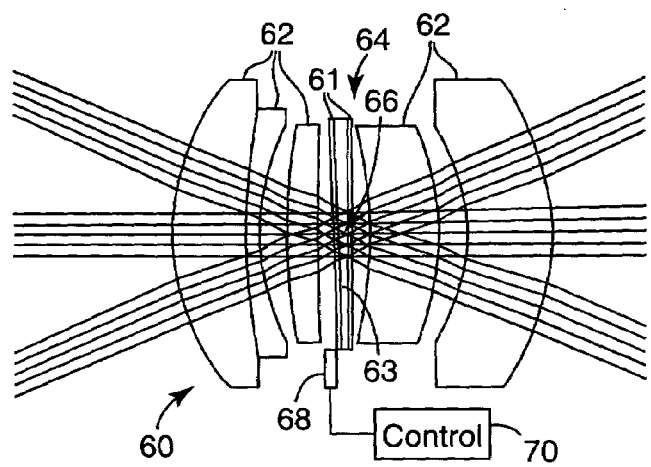
FIG. 6 is a schematic side view of a projection lens assembly according to the present invention having multiple lens elements and a pixel-shifting element configured as a wedge.

FIG. 6 is a schematic side view of a projection lens assembly 60 according to the present invention having multiple lens elements 62 and a pixel-shifting element 64 that includes a configurable wedge formed of a pair of transparent optical plates 61 separated by a compressible or deformable material 63 such as silicone. To provide one-dimensional pixel shifting as illustrated in FIG. 2, wedge-shaped pixel-shifting element 64 is cyclically tilted across an axis 66 to alternately form an upward tilt and a downward tilt.

Wedge-shaped pixel-shifting element 64 is positioned at about a pupil or stop location 65 within projection lens assembly 60. At least one of plates 61 of pixel-shifting element 64 is physically rocked across deformable material 63 by an actuator 68 to alternately provide the upward tilt and the downward tilt. Actuator 68 is coupled to a control circuit 70, which provides pixel-shifting control signals that are coordinated with the activation of picture elements of pixelated display device 14.

Actuator 68 may be implemented with a piezoelectric or piezoceramic transducer configured to impart the back and forth rocking motion. As is known in electromechanical systems design, actuator 68 may alternatively be implemented with or include a voice-coil, a solenoid, or any other electro-magnetic effect that can achieve the desired motion. In some implementations, pixel-shifting element 64 is moved into distinct positions in an approximation of a square-wave type motion. In other implementations, pixel-shifting element 64 can be moved into the positions with a sinusoidal, resonant motion. Generally, pixel-shifting element 64 shifts between positions during times when the display image is dark (e.g., blanked) or inactive, such as during a retrace period.

To provide two-dimensional pixel shifting as illustrated in FIG. 5, wedge-shaped pixel-shifting element 64 is also rocked about a second axis (e.g., generally parallel to a vertical line between plates 61 as they are illustrated in FIG. 6, the second axis not shown) by another actuator (not shown) that operates out-of-phase with the rocking about axis 66 to provide pixel-shifting in the four directions. The combined rocking about axis 66 and the second axis effectively provides rotational positioning of the pixels.

Figure 7:
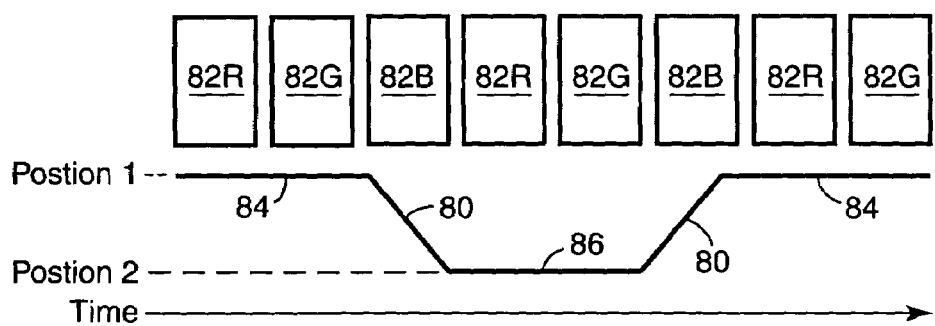
FIG. 7 is a schematic timing diagram illustrating one implementation of timing coordination of pixel shifting relative to color-component sub-frames of a field-sequential display system.

FIG. 7 is a schematic timing diagram illustrating one implementation of timing coordination of pixel shifting 80 relative to color-component sub-frames 82 in a field-sequential display system. As an example, such a projection display system 10 could employ a pixelated display device 14 in the form of a digital micromirror device of the type available from Texas Instruments, Inc. In such a system 10, illumination system 12 could include a color wheel (or other color selection mechanism) having at least red, green and blue color segments, as is known in the art. Color-component sub-frames 82 are designated as R, G, and B to correspond to successive red, green, and blue field-sequential color components over time.

In this implementation, pixel shifts 80 between first and second pixel positions 84 and 86 are coordinated with the blue color-component sub-frames 82B, which represents a time period of about 3 milliseconds. The timing coordination implementation illustrated in FIG. 7 utilizes the weaker luminance of the blue color component and the relatively poor resolution of blue color-component by human vision to reduce or minimize visual artifacts that might arise during pixel shifts 80. Although this can result in slight blurring of the blue color-component sub-frames 82B, the blurring can be visually insignificant due to the low luminance and poor resolution of blue light. In some implementations, the blue color-component sub-frames 82B may be considered the "darkest" of the color-component sub-frames, but other display implementations can include even darker sub-frames. For example, some display systems can include a black sub-frame for image refresh or other display operations.

The human visual system is much less sensitive to blue wavelengths, and in many color display the blue color-component makes up only about 8% of the luminance. By comparison, the green color-component is commonly about 69% of luminance and the red color component is about 23% of luminance at a balanced white point. As a result, shifting during the blue color component can be nearly invisible, which is advantageous during color television moving pictures and in case of any overshooting and other complex motions of pixel-shifting actuator 68.

Figure 8:
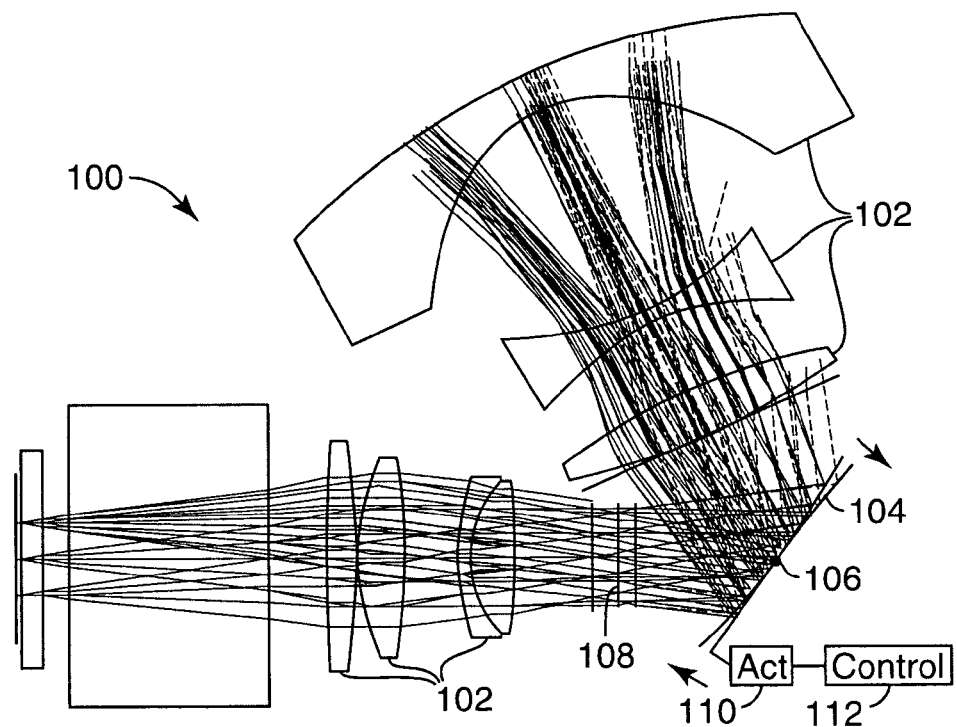
FIG. 8 is a schematic side view of another projection assembly according to the present invention having multiple lens elements and a pixel-shifting element in the form of a fold mirror providing one-dimensional pixel shifting.

FIG. 8 is a schematic side view of another projection lens assembly 100 according to the present invention having multiple lens elements 102 and a pixel-shifting element 104 in the form of a fold mirror. To provide one-dimensional pixel shifting as illustrated in FIG. 2, pixel-shifting fold mirror element 104 is cyclically tilted back and forth about one central rotational axis 106.

Pixel-shifting fold mirror element 104 is positioned in a center region of projection lens assembly 100 in the vicinity of a pupil or stop location 108. Pixel-shifting element 104 is physically tilted by an actuator 110, which may be implemented with a piezoceramic transducer, or an alternative actuator, to impart the tilting motion at an edge of element 104. Pixel-shifting fold mirror element 104 is supported at its edges by a stiff, light-weight frame (not shown) that is supported at a hinge or pivot aligned with rotational axis 106. Actuator 110 is coupled to the frame and is controlled by a control circuit 112, which provides pixel-shifting control signals that are coordinated with the activation of picture elements of pixelated display device 14.

In an implementation with one-dimensional pixel shifting, pixel-shifting element 104 may tilted over a range of about 0.02 degrees between a pair of positions to provide pixel-shifting of about one-half the pixel pitch. This implementation could include pixelated display device 14 with a diagonal dimension of 0.6 inch (15.25 mm) and a 13.8 μm pixel pitch, and display screen 20 with a diagonal dimension of 50 inches (127 cm). Such tilting can be achieved with actuator 110 imparting a translation of edges of pixel-shifting element 104 of about 10 μm during the cyclic tilting. Such translational distances are within the scope of commercially-available piezoelectric devices.

Figure 9:
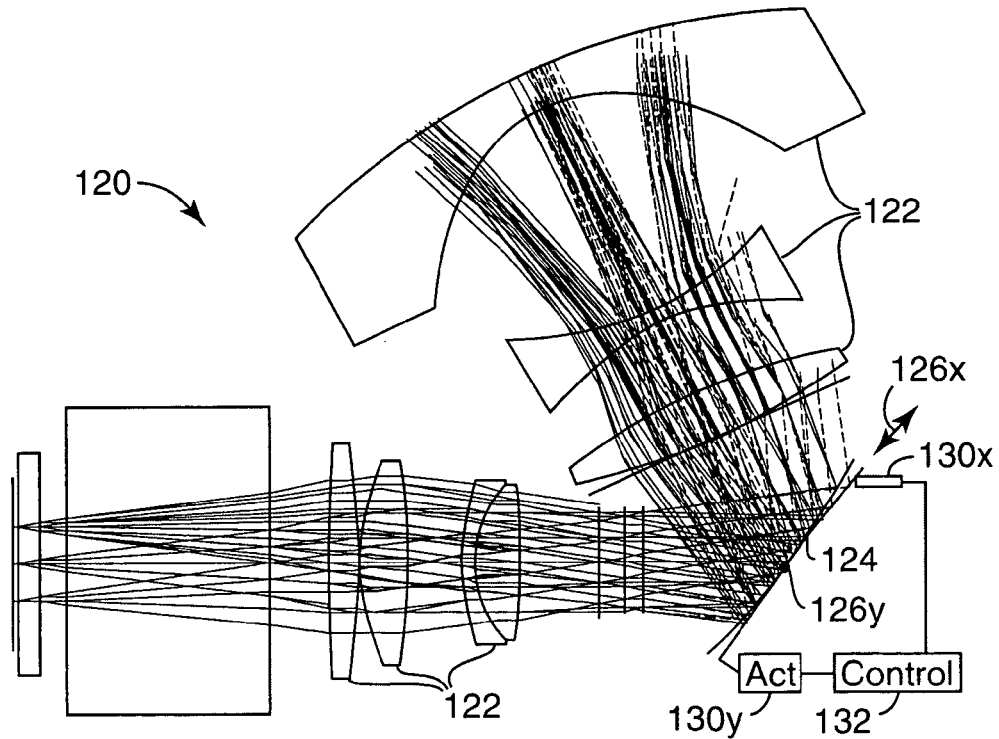
FIG. 9 is a schematic side view of another projection assembly according to the present invention having multiple lens elements and a pixel-shifting element in the form of a fold mirror providing two-dimensional pixel shifting.

FIG. 9 is a schematic side view of another projection lens assembly 120 according to the present invention having multiple lens elements 122 and a pixel-shifting element 124 in the form of a fold mirror. Projection lens assembly 120 is substantially the same as projection lens assembly 100, but is adapted to provide two-dimensional pixel shifting as illustrated in FIG. 5. Accordingly, pixel-shifting fold mirror element 124 is cyclically tilted back and forth about a pair of rotational axes 126 and 126Y.

Pixel-shifting element 124 is physically tilted by a pair of actuators 130 and 130Y, which may be implemented with piezoceramic transducers, or an alternative actuators, configured to impart the tilting motion at edges of element 124. Pixel-shifting fold mirror element 124 is supported at its edges by a stiff, light-weight frame (not shown) that is supported at a gimbaled pair of hinges or pivots aligned with rotational axes 126 and 126Y. Actuators 130 and 130Y are coupled to the frame and provide tilting about respective axes 126 and 126Y. A control circuit 132 provides to actuators 130 and 130Y pixel-shifting control signals that are coordinated with the activation of picture elements of pixelated display device 14.

Figure 10:
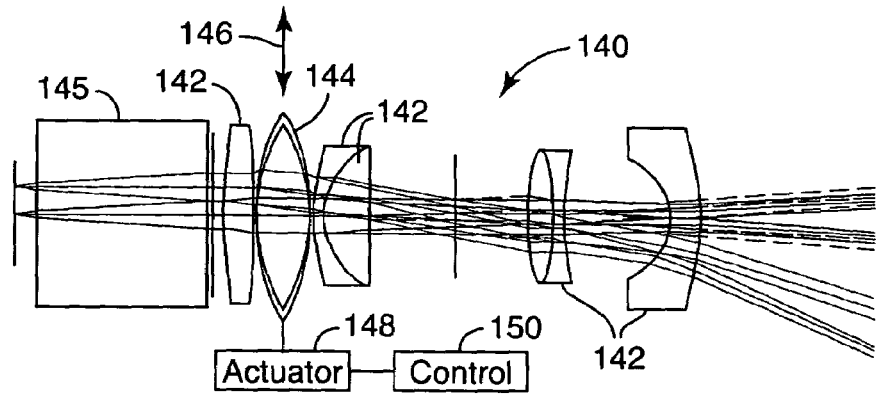
FIG. 10 is a schematic side view of another projection assembly according to the present invention having multiple projection optical lens elements, at least one of which is cyclically translated or shifted to function as a pixel-shifting element.

FIG. 10 is a schematic side view of another projection lens assembly 140 according to the present invention having multiple projection optical lens elements 142, at least one of which is cyclically translated or shifted to function as a pixel-shifting element 144. Projection lens assembly 140 is illustrated as receiving light from a crossed dichroic combiner 145, which combines light passing from multiple pixelated display panels along separate color-component paths. An example of such a projection display system in which projection lens assembly 140 could be employed is described in U.S. Pat. No. 6,067,128 of Imai.

To provide one-dimensional pixel shifting as illustrated in FIG. 2, pixel-shifting element 144 is cyclically shifted or translated back and forth in one pair of opposed lateral directions 146. To provide two-dimensional pixel shifting as illustrated in FIG. 5, pixel-shifting element 144 is in addition cyclically shifted or translated back and forth in another pair of opposed lateral directions (not shown) that are transverse (e.g., perpendicular) to directions 146.

Projection lens assembly 140 is distinguished from projection lens assembly 60 in that the former does not include a separate element (e.g., pixel-shifting wedge element 64) that functions solely to provide pixel shifting. Instead, pixel shifting lens element 144 has at least one curved major surface that cooperates with lens elements 142 to provide the optical characteristics of projection lens assembly 140. The choice of which lens element or elements to operate as pixel shifting element 144 can be made depending on optical sensitivity. A lens element with more optical power (i.e., a shorter focal length) will have a faster displacement effect. Powerful negative (e.g., concave) lens elements can also be moved to effect pixel shifting.

Pixel-shifting element 144 is physically moved in lateral directions 146 by an actuator 148, which may be implemented with a piezoceramic transducer, or an alternative actuator, configured to impart the lateral motion. Actuator 148 is coupled to a control circuit 150, which provides pixel-shifting control signals that are coordinated with the activation of picture elements of pixelated display device 14.

In implementations with either one- or two-dimensional pixel shifting, translational shifting of pixel-shifting element 144 by a distance of, for example, 20 um along either translational axis produces a half-pixel shift at the projected image.

Figure 11:
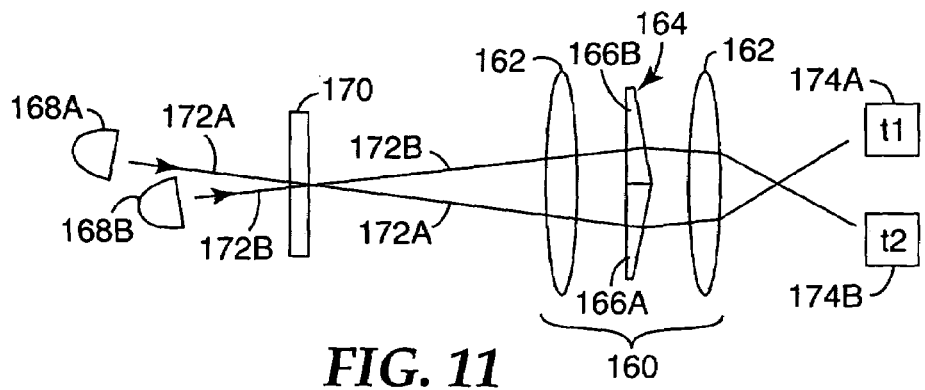
FIG. 11 is a schematic side view of a projection assembly and a pixel-shifting element configured as a pair of end-to-end fixed wedges.

FIG. 11 is a schematic side view of a projection lens assembly 160 according to the present invention having multiple lens elements 162 (only two shown) and a pixel-shifting element 164 configured as a pair of end-to-end fixed wedges 166A and 166B. A pair of illumination systems 168A and 168B alternately illuminate a pixelated display device 170 along offset optical axes 172A and 172B.

During its illumination by illumination system 168A, pixelated display device 170 is imaged upon wedge 166A, which directs pixels 174A (only one shown) to a first offset location. During its illumination by illumination system 168B, pixelated display device 170 is imaged upon wedge 166B, which directs pixels 174B (only one shown) to a second offset location that is different from the first location. Illumination systems 168A and 168B may be may be alternately activated or shuttered to provide the alternating illumination.

Figure 12:
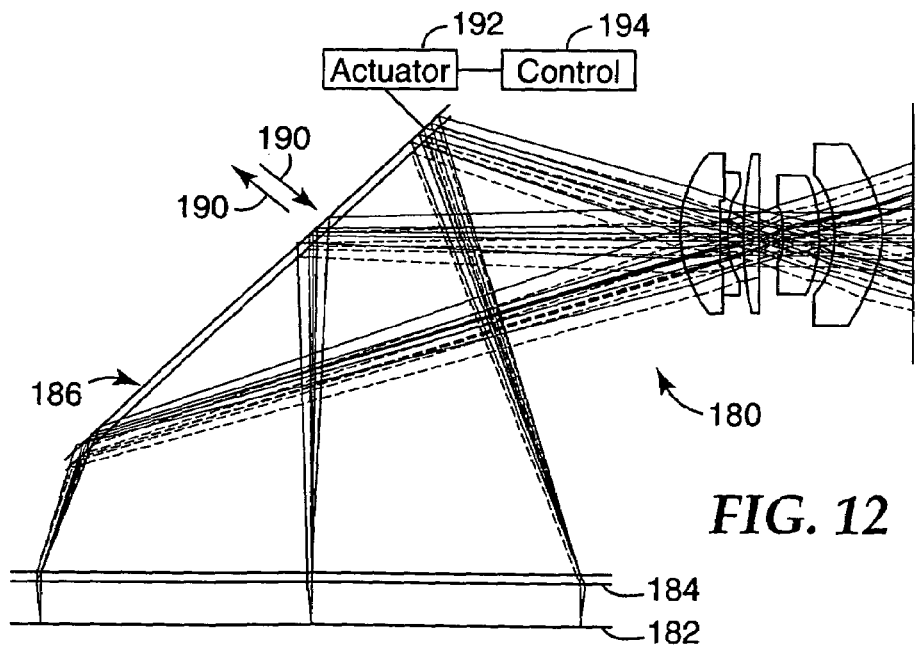
FIG. 12 is a partial schematic side view of a projection display system employing pixel-shifting optical interlace for increased pixel addressability.

FIG. 12 is a partial schematic side view of a projection display system 180 employing pixel-shifting optical interlace for increased pixel addressability. Projection system 180 includes an illumination system (not shown), a pixelated display device 182, a converging Fresnel lens 184, and a fold mirror 186 that directs light to a multi-lens projection lens assembly 188. To provide one-dimensional pixel shifting as illustrated in FIG. 2, fold mirror 186 is operated as a pixel-shifting element and is cyclically shifted or translated back and forth in one pair of opposed directions 190 that are generally perpendicular to the plane of mirror 186.

Pixel-shifting fold mirror element 186 is physically moved in opposing directions 190 by an actuator 192, which may be implemented with a piezoceramic transducer, or an alternative actuator. Translational shifting of mirror 186 in directions 190 that are perpendicular to the plane of mirror 186 cause a displacement of the optical center of projection lens assembly 188, and thereby the desired one-half pixel shift. Actuator 192 is coupled to a control circuit 194, which provides pixel-shifting control signals that are coordinated with the activation of picture elements of pixelated display device 182. In an alternative implementation, Fresnel lens 184 may also be shifted with mirror 186.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

What is claimed is:

1. A projection display system, comprising:
   a pixelated display device;
   an illumination system that directs illumination light to the pixelated display device for display information to be imparted on the light; and
   a projection lens assembly that receives the light with imparted display information from the pixelated display device for projecting the light toward a display screen, the projection lens assembly including a pixel-shifting element that cyclically shifts between at least two positions within the projections lens assembly to form at the display screen at least two interlaced arrays of pixels, the pixel-shifting element including a fold mirror positioned within the projection lens assembly and in which the cyclic shifting of the pixel-shifting element includes cyclic tilting of the fold mirror.

2. The projection display system of claim 1 in which the pixel-shifting element cyclically shifts between two positions that provide a vertical offset between two interlaced arrays of pixels.

3. The projection display system of claim 1 in which the pixel-shifting element cyclically shifts between four positions to form at the display screen four interlaced arrays of pixels.

4. The projection display system of claim 1 in which the display device is operated in a field-sequential manner with red, green, and blue color sub-fields and the pixel-shifting element cyclically shifts between the at least two positions during blue color sub-fields.

5. The projection display system of claim 1 in which the pixel-shifting element is cyclically shifted by an electromechanical transducer.

6. The projection display system of claim 5 in which the electromechanical transducer includes a piezoelectric transducer.

7. The projection display system of claim 5 in which the electromechanical transducer does not include a piezoelectric transducer.

8. A projection display system, comprising:
- a pixelated display device having an array of adjacent picture elements;
- an illumination system that directs illumination light to the pixelated display device for display information to be imparted onto light in which the illumination system includes first and second illumination sources that alternately direct illumination along first and second optical axes; and
- a projection lens assembly that receives the light with imparted display information from the pixelated display device for projecting the light toward a display screen, the projection lens assembly including a pixel-shifting wedge element, that includes first and second end-to-end fixed wedge elements that are aligned with the first and second optical axes, the pixel-shifting wedge element cyclically providing shifting of the light with imparted display information to form at the display screen at least two interlaced arrays of pixels.

9. A projection display system, comprising:
- a pixelated display device;
- an illumination system that directs illumination light to the pixelated display device for display information to be imparted on the light in a field-sequential manner, the illumination light including successive red, green, and blue color sub-fields; and
- a projection lens assembly positioned to receive light imparted with display information by the pixelated display device to project the light toward a display screen; and
- a pixel-shifting element that cyclically shifts between at least two positions only during blue color sub-fields and not during other color sub-fields to form at a display screen at least interlaced arrays of pixels.

10. The projection display system of claim 9 in which the pixel-shifting element is positioned within the projection lens assembly.

11. The projection display system of claim 9 in which the pixel-shifting element includes a transparent wedge positioned within the projection lens assembly and in which the cyclic shifting of the pixel-shifting element includes tilting of the wedge between first and second positions.

12. A projection display system, comprising:
- a pixelated display device;
- an illumination system that directs illumination light to the pixelated display device for display information to be imparted on the light;
- a projection lens assembly that receives the light with imparted display information from the pixelated display device for projecting the light toward a display screen;
- a projection lens assembly including a pixel-shifting element in the vicinity of a stop position, that cyclically shifts with non-rotational translation between at least two positions to form at the display screen at least two interlaced arrays of pixels, the pixel-shifting element including a fold mirror that has a planar surface.

* * * * *

UNITED STATES PATENT AND TRADEMARK OFFICE
CERTIFICATE OF CORRECTION

PATENT NO. : 7,182,463 B2
APPLICATION NO. : 10/744997
DATED : February 27, 2007
INVENTOR(S) : Arlie R. Conner It is certified that error appears in the above-identified patent and that said Letters Patent is hereby corrected as shown below:

Column 2,
Line 25, delete "electromechanical" and insert -- electro-mechanical --, therefor.

Column 5,
Line 47, delete "electromechanical" and insert -- electro-mechanical --, therefor.

Column 7,
Line 15, after "axes" delete "126" and insert -- 126X --, therefor.

Line 17, after "actuators" delete "130" and insert -- 130X --, therefor.

Line 23, after "axes" delete "126" and insert -- 126X --, therefor.

Line 23, after "actuators" delete "130" and insert -- 130X --, therefor.

Line 25, after "axes" delete "126" and insert -- 126X --, therefor.

Line 26, after "actuators" delete "130" and insert -- 130X --, therefor.

Column 8,
Line 63, in claim 1, after "element" insert -- in the vicinity of a stop position, wherein the pixel-shifting element --.

Line 63, in claim 1, before "cyclically" delete "that".

Line 64, in claim 1, delete "projections" and insert -- projection --, therefore.

Column 9,
Line 20, in claim 6, delete "electromechanical" and insert -- electro-mechanical --, therefor.

Line 23, in claim 7, delete "electromechanical" and insert -- electro-mechanical --, therefor.

Line 30, in claim 8, delete "onto" and insert -- on the --, therefor.

UNITED STATES PATENT AND TRADEMARK OFFICE
CERTIFICATE OF CORRECTION

PATENT NO. : 7,182,463 B2
APPLICATION NO. : 10/744997
DATED : February 27, 2007
INVENTOR(S) : Arlie R. Conner It is certified that error appears in the above-identified patent and that said Letters Patent is hereby corrected as shown below:

<u>Column 10,</u>
Line 17, in claim 9, after "least" insert -- two --.

Line 36, in claim 12, before "projection" delete "a" and insert -- the --therefor.

Signed and Sealed this

Third Day of July, 2007

JON W. DUDAS
*Director of the United States Patent and Trademark Office*